(12) United States Patent
Poliskie et al.

(10) Patent No.: US 6,189,961 B1
(45) Date of Patent: Feb. 20, 2001

(54) INTERIOR TRIM SUPPORT PANEL WITH INCORPORATED SUNROOF DRAIN

(75) Inventors: Lawrence M. Poliskie, Shelby Township; D. Scott Bittinger, Fenton, both of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/309,136

(22) Filed: May 10, 1999

(51) Int. Cl.$^7$ .................................................. B60R 13/07
(52) U.S. Cl. ............................................ 296/213; 296/208
(58) Field of Search .................................. 296/213, 208, 296/214, 901, 39.1; 137/354, 351; 285/141.1, 136.1

(56) References Cited

U.S. PATENT DOCUMENTS

| | | |
|---|---|---|
| 3,078,122 | 2/1963 | Werner . |
| 4,293,161 * | 10/1981 | Lutz ...................................... 296/213 |
| 4,355,843 | 10/1982 | Murakami . |
| 4,589,694 | 5/1986 | Kempter . |
| 4,844,532 | 7/1989 | Ono et al. . |
| 4,892,351 | 1/1990 | Ono et al. . |
| 5,332,282 | 7/1994 | Maeda et al. . |
| 5,527,081 * | 6/1996 | Rausch et al. ..................... 296/208 X |
| 5,810,429 | 9/1998 | Jardin et al. . |
| 5,902,008 | 5/1999 | Butsuen et al. . |

FOREIGN PATENT DOCUMENTS

| | | | |
|---|---|---|---|
| 2229628 * | 1/1974 | (DE) .................................... 296/208 |
| 45218 * | 3/1984 | (JP) .................................... 296/901 |
| 143776 * | 8/1984 | (JP) .................................... 296/208 |

* cited by examiner

Primary Examiner—Dennis H. Pedder
(74) Attorney, Agent, or Firm—Lawrence J. Shurupoff

(57) ABSTRACT

A trim panel for an automotive vehicle having a sunroof is provided. The trim panel has a plastic injection molded body. Integrally co-molded in the plastic injection body is a drainage conduit. An inlet is provided on the conduit for receiving water drainage from the sunroof of the vehicle. The inlet has an extension configured for placement of a connector hose thereto. An outlet is also provided to the conduit for draining water from around the sunroof to the ambient. The outlet has an extension configured for placement of a connector hose thereto. The trim panel is typically connected to the C pillar of the vehicle. A connector hose from the sunroof is connected to the trim panel inlet. A connector hose is connected to the trim panel outlet and is connected with the ambient.

6 Claims, 5 Drawing Sheets

INTERIOR TRIM SUPPORT PANEL WITH INCORPORATED SUNROOF DRAIN

BACKGROUND OF THE INVENTION

1. Field of the Invention

The field of the present invention is that of automotive vehicles with sunroof drain conduits. More particularly, the field of the present invention is that of a trim panel for a C pillar of an automotive vehicle with an incorporated sunroof drain conduit.

2. Description of Prior Developments

To allow an automotive vehicle operator and passenger to enjoy the environment, many automobiles now come equipped with sunroof assemblies. The typical sunroof assembly has an opening provided in the roof of the vehicle. A tinted glass or steel plate is provided for closing the opening. A mechanism is provided for moving the sunroof panel between an opened position and a closed position either by a sliding motion or by a tilting motion of the sunroof panel. The mechanism may be driven either manually or by an external power source such as an electric motor. The sunroof panel is provided with a sealing structure which, when the sunroof is closed keeps out rainwater from the passenger compartment. The sunroof assembly is additionally provided with a trough which extends the edge of the roof opening and receives water which is passed through the sealing structure. This trough is connected to drain tubes which are typically connected to the bottom parts of the corners of the trough. The rear drain tubes are routed to the lower wet area of the vehicle down through the C pillar and then into the ambient. The drain tubes are hidden from view by the headliner of the roof and by an inner trim panel of the C pillar.

A significant device which has materially contributed to the safety of vehicles is a supplemental inflation restraint commonly referred to as an airbag. Airbags are typically placed in the dashboard and inflate upon a frontal impact of the vehicle. To further enhance the safety aspects of the vehicles some vehicles are now being developed with side-mounted airbags. In one type of side-mounted airbag, an airbag canister is mounted to the C pillar of the vehicle. An inflatable airbag envelope (sometimes referred to as the bag) is fluidly connected with the canister and extends from the C pillar underneath the headliner all the way to the A pillar of the vehicle. The airbag system is then connected to a sensor which is controlled to inflate upon a side impact of the vehicle. Prior to the installation of a side-mounted airbag, there existed a significant amount of space between the innermost trim panel (which is exposed to the interior of the vehicle) and an outermost trim panel (which is connected with the frame of the vehicle and is sometimes commonly referred to as the outer trim panel or the trim support panel) to install a flexible hose for the sunroof drain. However, with the addition of the side mounted airbag and canister, most of the above-noted space is taken. In an attempt to overcome this problem a rigid drain tube can be installed in the C pillar. However, installation of the rigid drain tube can cause the drain tube to kink and can also cause noise problems from rattling within the C pillar. To avoid a noise problem from rattling, a flexible tube may be installed. However, the flexible tube can easily be pinched or kinked during installation leading to insufficient drainage. Both the rigid tube and the flexible tube can be inadvertently disintegrated by the inflation of the airbag which is undesirable.

It would be desirable to provide a sunroof drain conduit through the C pillar that will not be a source of a rattling noise, and will not kink or collapse. It is also desirable to provide a sunroof drainage conduit which will be easy to install and will be of a low cost. It is also desirable to provide a sunroof drainage conduit which will not be disintegrated by inflation of an airbag.

SUMMARY OF THE INVENTION

To meet the above-noted desires the revelation of the present invention is brought forth. The present invention in a preferred embodiment provides a molded trim panel with the sunroof drain conduit incorporated therein. Installation of the drain through the C pillar is completed with installation of the trim panel. The drain conduit cannot collapse or be kinked or generate a rattling noise. The conduit is protected from disintegration by virtue of inflation of the airbag.

The above-noted features and other advantages of the present invention will become more apparent to those skilled in the art as the invention is further explained in the accompanying drawings and detailed description.

DETAILED DESCRIPTION OF THE DRAWINGS

Figure 1:
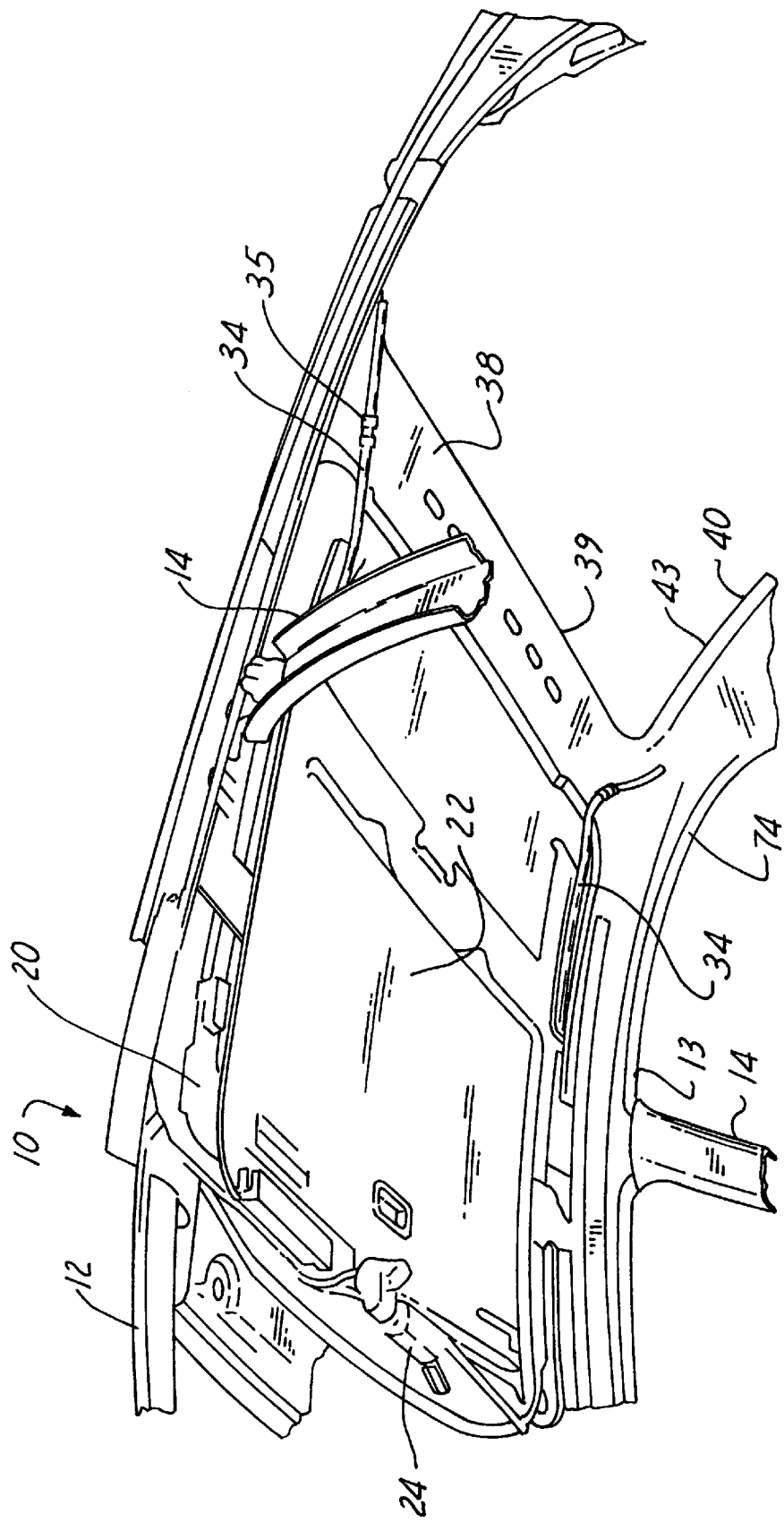
FIG. 1 is a perspective view of an automotive vehicle frame roof with portions of the roof being removed for clarity of illustration showing the closed position of the sunroof along with the B and C pillars of the vehicle.

Referring to FIGS. 1–5, an automotive vehicle 10 is shown having a frame 12. The vehicle frame 12 has two parallel spaced roof side beams 13. Each roof side beam 13 joins an A pillar (not shown) with a B pillar 14 and a C pillar 16. In FIG. 1 the primary portion of the fixed roof panel has been removed for clarity of illustration. However, it is apparent to those skilled in the art that the fixed roof panel extends generally between the roof side beams 13.

Figure 2:
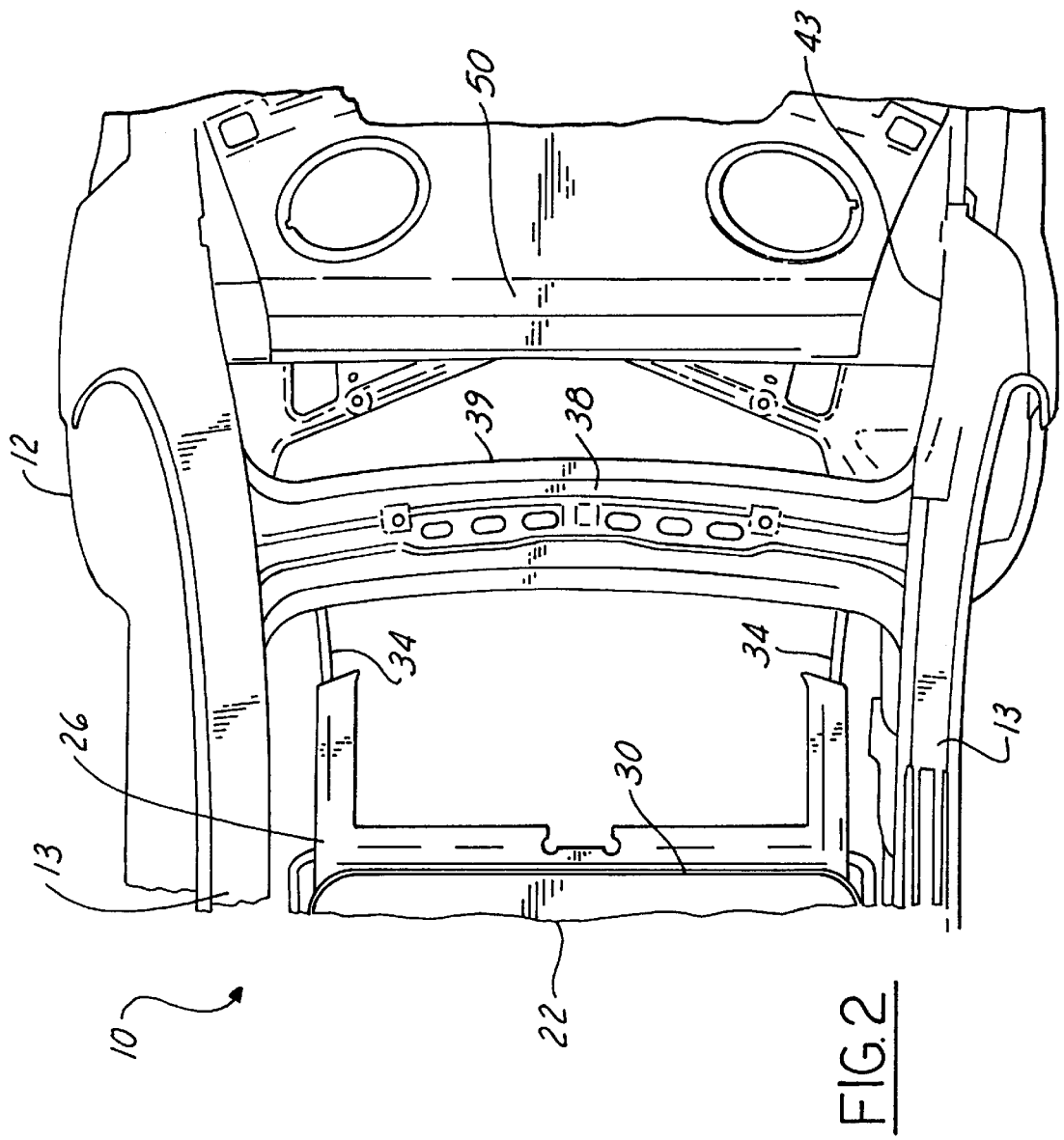
FIG. 2 is a top plan view of a rear portion of the automotive vehicle with portions of the roof being removed for clarity of illustration.

Shown in an installed closed position is a sunroof assembly 20. The sunroof assembly 20 is typically held in position by a reinforcement that extends between the two B pillars 14. The sunroof assembly 20 has a selectively movable panel 22. The movable panel 22 is actuated by an electric motor 24. Supporting the movable panel 22 is a surrounding sunroof frame 26 (FIG. 2). The sunroof frame 26 provides an encircled aperture which the movable panel 22 can selectively expose. The sunroof frame 26 has a trough (not shown) which surrounds the sunroof movable panel 22. The trough collects any precipitation that passes through a seal 30 which is juxtaposed between the sunroof movable panel 22 and the fixed surrounding sheet metal. Fluidly connected with the trough are first portions of a sunroof drain tube conduit provided by tubular flexible connector hoses 34. Each hose 34 passes through a respective hose clamp 35 (FIGS. 3 and 4) which mounts a portion of the hose 34 to the roof.

The roof side beams 13 are connected adjacent their rearward ends by a transverse cross-member 38. A rearward end 39 of the cross-member 38 defines an upper portion of a rear window opening 40. The C pillars have an inboard edge 43 which defines the lateral edge of the window opening 40. The C pillars 16 also connect the roof side beams 13 to the trunk 50.

The C pillar 16 along an interior side has connected thereto an injection molded trim support panel 7 (or outer trim panel). The trim panel 7 mounts an adjacent inner (interior) trim panel 90. The trim panel 7 has a long inclined edge 71 which is positioned on the C pillar 16 closely adjacent the C pillar inboard edge 43. A corner edge 72 of the trim panel 7 is positioned adjacent a rear door opening 74 (FIG. 1) of the vehicle frame 12.

Figure 3:
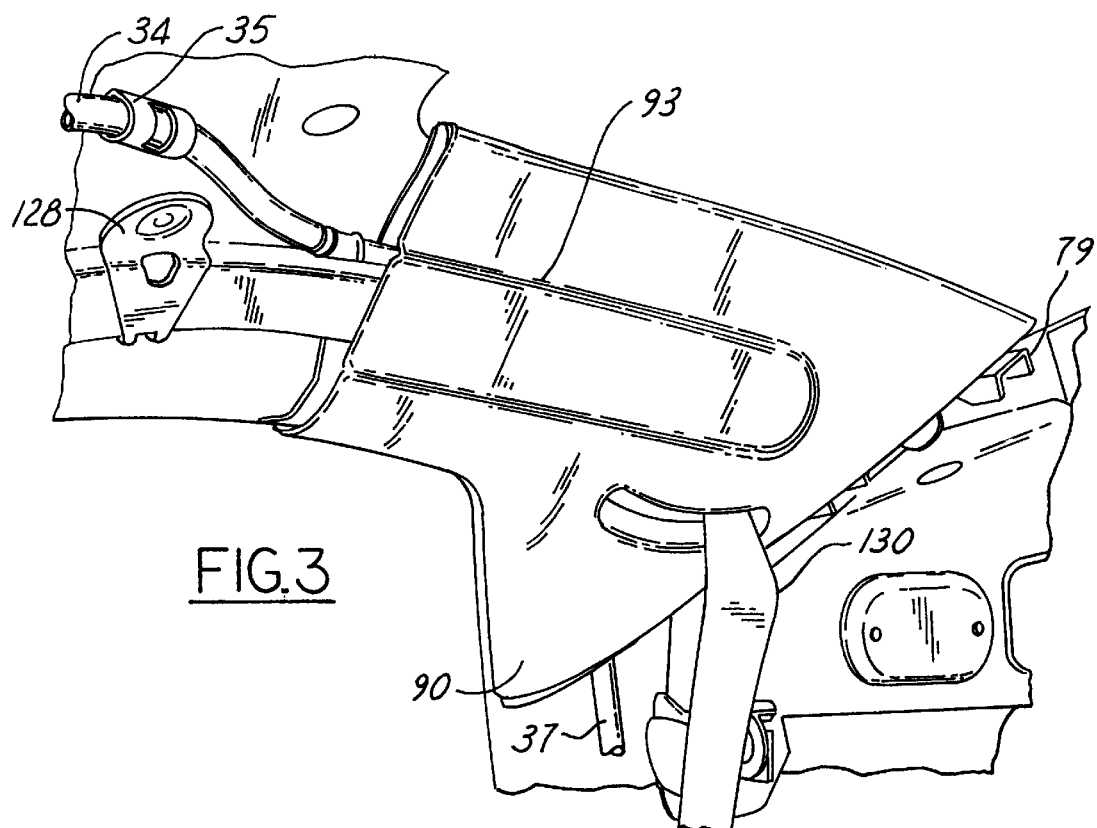
FIG. 3 is a side perspective view of the C pillar shown in FIGS. 1 and 2 with an inner (interior) trim panel installed on the C pillar.
Figure 4:
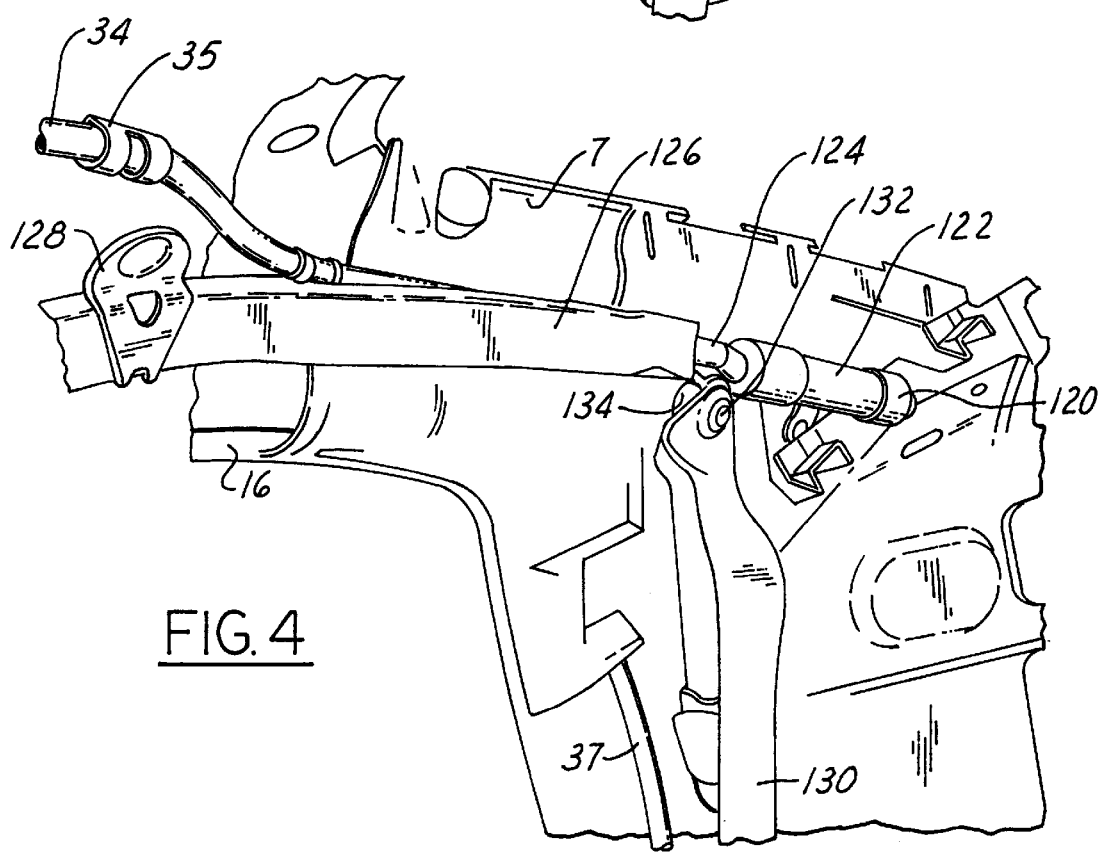
FIG. 4 is a view of the C pillar substantially similar to that of FIG. 3 with the inner trim panel being removed exposing the trim support panel (outer trim panel) according to the present invention and also illustrating the positioning of the airbag system including the airbag canister and the airbag envelope.
Figure 5:
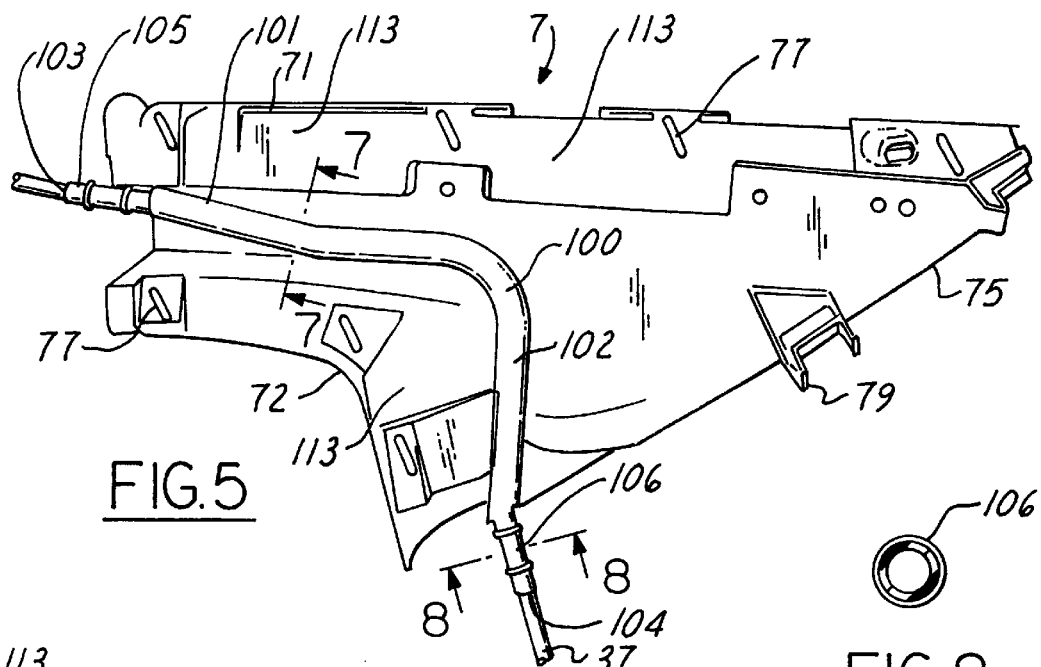
FIG. 5 is a side elevational view of the trim support panel shown in FIG. 4.
Figure 8:
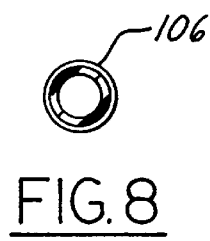
FIG. 8 is a sectional view taken along line 8—8 of FIG. 5.
Figure 6:
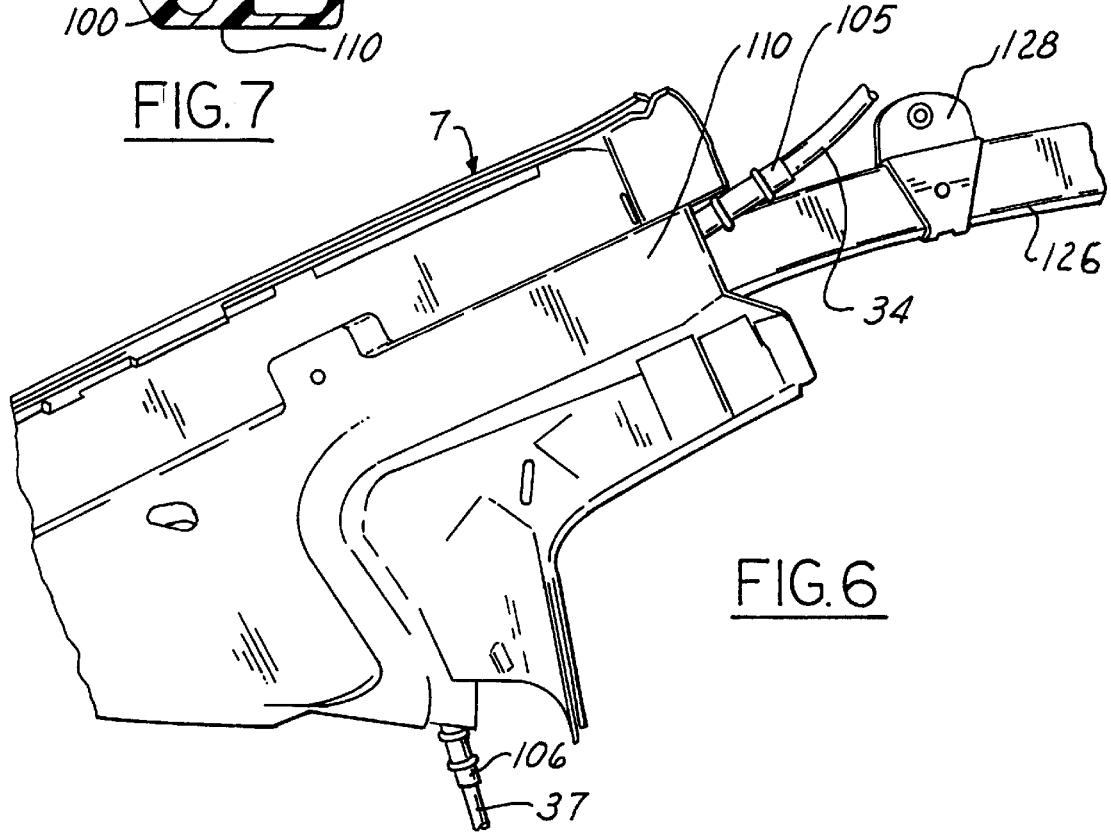
FIG. 6 is a view of the trim support panel shown in FIGS. 3, 4, and 5 illustrating its position in the vehicle looking towards the passenger compartment with the sheet metal of the C pillar being removed for clarity of illustration.
Figure 9:
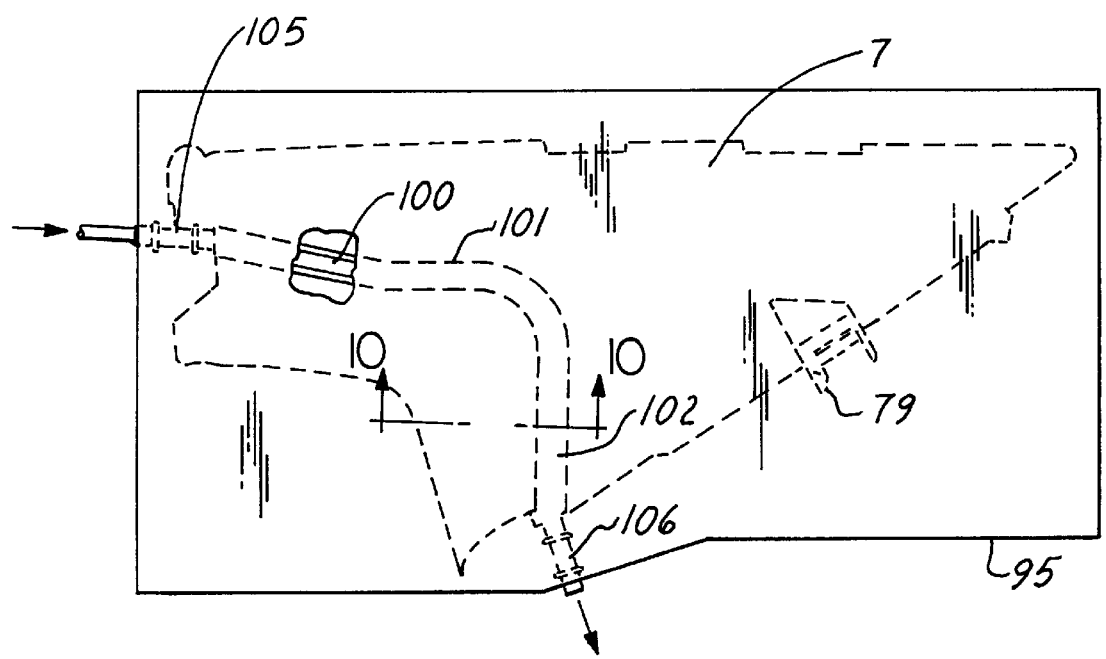
FIG. 9 is a view of the trim panel support member shown in FIGS. 4, 5 and 6 during its fabrication in a mold.

The trim panel 7 has a bottom flat edge 75 that runs adjacent to an upper end of the trunk 50. The trim panel 7 has a series of elongated fastener holes 77 to allow its installed position on the C pillar 16 during assembly to be adjusted. Additionally the trim panel 7 along edge 75 has two hooks 79 which help mount the inner trim panel 90 (FIG. 3). The trim panel 7 is typically fabricated from a polycarbonate ABS plastic blend. Co-molded with the trim panel 7 is a sunroof drain conduit 100. The conduit 100 has a first section 101 which runs generally parallel with the longitudinal axis of the vehicle frame and usually extends generally horizontally with a slight vertical decline. The conduit 100 has a connected second section 102 which is generally orientated vertically. The two sections 101 and 102 form an elbow or L shaped passage. The conduit 100 also has an inlet 103 to receive water drainage from the sunroof and an outlet 104 to drain the water drainage to the ambient. The inlet 103 has a tubular externally ribbed extension configured for placement of the connector hose 34 (sunroof conduit first portion) thereto. In FIGS. 5 and 6 the portion of the connector hose 34 which extends over the tubular extension 105 has been removed for clarity of illustration. In like manner the outlet 104 has a tubular ribbed extension 106 which a connector hose 37 (which is connected with the ambient) may be placed onto. The conduit 100 of the trim panel provides for a third portion of the drainage conduit of the sunroof between the sunroof drainage conduit first and second portions (hoses 34 and 37).

Figure 7:
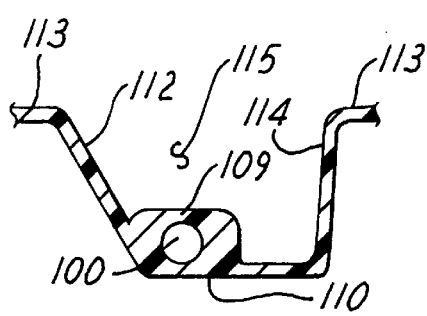
FIG. 7 is a sectional view taken along line 7—7 of FIG. 5.
Figure 10:
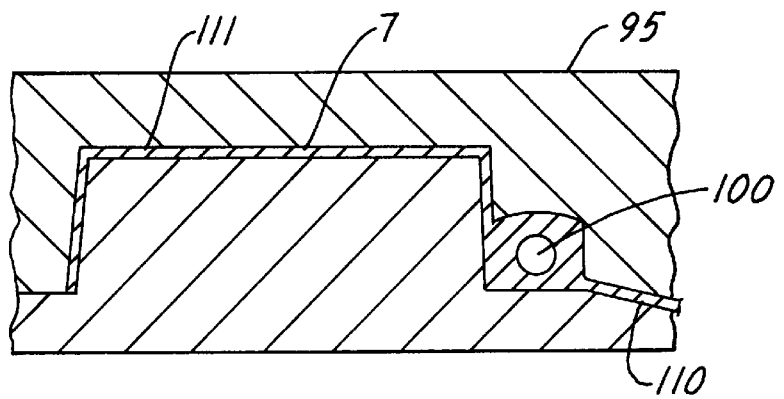
FIG. 10 is a sectional view taken along line 10—10 taken in FIG. 9.

Referring additionally to FIGS. 6–10, the conduit 100 can be fabricated by a pre-mold that is placed in a mold 95 that the trim panel 7 is fabricated in. However, in the examples shown in FIGS. 5–10, the integral conduit 100 is produced by a gas assisted mold process. The conduit 100 typically has a circular cross-section (FIGS. 7 and 10).

The trim panel 7 has an outer wall portion 110 facing the C pillar 16. Extending from the outer wall portion 110 are channel walls 112, and 114 (FIG. 7) which form a channel 115 therebetween. Channel walls 112 and 114 extend to inner wall portion 113. Referring back to FIG. 4, the C pillar 16 has fixedly connected thereto a collar 120. An airbag canister 122 is mounted to the C pillar 16 via the collar 120. The airbag canister 122 has a tubular extension 124. The tubular extension 124 is fluidly connected with an inflatable airbag envelope 126. The airbag envelope 126 extends along the roof side beam 13 past the B pillar 14 to the A pillar (not shown). A bracket 128 holds the airbag envelope 126 in position. A shoulder bag restraint 130 is anchored to the C pillar 116 by a fastener 132. The fastener 132 extends through an opening 135 provided in the trim panel 7.

The airbag envelope 126 passes through the channel 115. The conduit 100 passes underneath the channel 115 covering the air bag envelope 126 and is protected from an inflated airbag envelope 126 by the molded mass 109. The whole array of the conduit 100, the airbag canister 122, airbag envelope 126 and shoulder harness anchor fastener 132 are hidden from view from the interior of the vehicle by the interior trim panel 90. The interior trim panel 90 has a tear seam 93 to allow the juxtaposed airbag envelope 126 to escape.

The trim panel 7 provides several advantages. The first advantage of the trim panel 7 is that is provides the conduit 100. The conduit 100 provides a third connecting portion of a sunroof drainage conduit consisting of items 34, 100 and 37. The conduit 100 is not disintegrated by inflation of the airbag envelope 126. Installation of the conduit 100 is achieved with installation of the trim panel 7. The same trim panel 7 can be used for cars with sunroofs and cars without sunroof assemblies. Therefore, inventory can be lowered. Another advantage of the trim panel 7 is that there is no routing of the conduit required and there is no conduit which can vibrate and generate noise. Still another advantage of the conduit is that it can be utilized when the sunroof is installed upon an assembly line or if the sunroof is installed by a custom body builder.

While a preferred embodiment of the present invention has been disclosed, it is to be understood it has been described by way of example only, and various modifications can be made without departing from the spirit and scope of the invention as it is encompassed in the following claims.

What is claimed is:

1. A trim panel for a vehicle having a sunroof comprising:
   a plastic injection molded body;
   a gas assisted co-molded integral drainage conduit on said molded body, said conduit being generally elbow shaped;
   an inlet provided on said conduit for receiving water drainage from said sunroof, said inlet having an extension configured for placement of a connector hose thereto; and
   an outlet provided on said conduit for draining said water drainage to ambient, said outlet having an extension configured for placement of a connector hose thereto.

2. An automotive vehicle comprising a vehicle frame, said vehicle frame having a passenger compartment with a roof, said roof having an aperture, and said vehicle having at least one C pillar and a trunk connected to said roof by said C pillar;
- a sunroof for selectively exposing a portion of said aperture in said roof;
- a drainage conduit for said sunroof having a first portion extending towards said C pillar and a second portion extending from said C pillar to ambient; and
- a plastic injection molded trim panel connected with said C pillar, said trim panel having a plastic molded body and a drainage conduit third portion co-molded on said molded body, said drainage conduit third portion having an inlet for receiving water drainage from said sunroof via said conduit first portion, and said drainage conduit third portion having an outlet provided for draining said water drainage to ambient through said conduit second portion.

3. A vehicle as described in claim 2 further including an airbag being connected with said C pillar having an inflatable bag envelope underneath said conduit third portion and said inflatable bag envelope being juxtaposed between said drainage conduit third portion and an inner trim panel of said vehicle.

4. A trim panel as described in claim 1 wherein said trim panel has an outer wall portion and an inner wall portion and said conduit is adjacent to said outer wall portion.

5. A trim panel as described in claim 1 wherein said trim panel has an edge for positioning adjacent to a C pillar of an automotive vehicle between a roof and a trunk of said automotive vehicle.

6. A trim panel as described in claim 1 wherein said trim panel has an edge for positioning adjacent a roof of said vehicle.

* * * * *

UNITED STATES PATENT AND TRADEMARK OFFICE
CERTIFICATE OF CORRECTION

PATENT NO.    : 6,189,961 B1
DATED         : February 20, 2001
INVENTOR(S)   : Poliskie et al.

It is certified that error appears in the above-identified patent and that said Letters Patent is hereby corrected as shown below:

<u>Title page,</u>
Item [75], Inventors, add -- Zekai Akbay, Sterling Heights, MI -- and -- Gloria I. Delano, Macomb County, MI --

Signed and Sealed this

Second Day of August, 2005

JON W. DUDAS
*Director of the United States Patent and Trademark Office*